United States Patent [19]
Sato et al.

[11] Patent Number: 5,666,770
[45] Date of Patent: Sep. 16, 1997

[54] VIBRATION DAMPING EQUIPMENT

[75] Inventors: Kosuke Sato; Nobuyoshi Haniuda; Fumihide Kozuma, all of Sagamihara, Japan

[73] Assignee: Kayaba Kogyo Kabushiki Kaisha, Tokyo, Japan

[21] Appl. No.: 423,259

[22] Filed: Apr. 17, 1995

[30] Foreign Application Priority Data

Apr. 22, 1994 [JP] Japan .................... 6-084908

[51] Int. Cl.$^6$ .................. E04H 9/02; F16F 7/10
[52] U.S. Cl. .................. 52/167.2; 52/1; 188/378
[58] Field of Search .................. 52/167.2, 1, 167.1; 188/378, 379, 380

[56] References Cited

U.S. PATENT DOCUMENTS

| | | | |
|---|---|---|---|
| 4,819,182 | 4/1989 | King et al. | 364/508 |
| 5,255,764 | 10/1993 | Kurabayashi et al. | 52/167.2 X |
| 5,410,845 | 5/1995 | Sakamoto et al. | 52/167.2 |
| 5,421,129 | 6/1995 | Sakamoto et al. | 52/167.2 X |
| 5,447,001 | 9/1995 | Nishimura et al. | 52/167.2 |

FOREIGN PATENT DOCUMENTS

| | | |
|---|---|---|
| 63-217075 | 9/1988 | Japan . |
| 1207574 | 8/1989 | Japan ............. 52/167.2 |
| 2224097 | 4/1990 | United Kingdom ........... 52/167.2 |

OTHER PUBLICATIONS

"A Guide to System Control Theory" (by K. Ogo and T. Mita, published by Jikkyo Shuppan Co., pp. 157–160, Dec. 15, 1979).

"Lessons in Estimation Theory for Signal Processing, Communications & Control" Jerry M. Mendel.

Primary Examiner—Michael Safavi
Attorney, Agent, or Firm—Jordan and Hamburg

[57] ABSTRACT

A mass supported on a structure is driven by an actuator such that it moves in a direction of a vibration of the structure. A mechanism for detecting state variables relating to the vibration of the structure and a Kalman filter for performing a predetermined calculation processing on the state variables by comparing with a structure model included therein are provided in order to estimate proper values of state variables. From these state quantifies, control input values are calculated based on an optimal feedback gain matrix preset on the basis of an optimal regulator theory, and applied to control the actuator. With this configuration, the vibration of the mass due to a high-order vibration mode of the structure and the vibration of the mass caused by the compressibility of a hydraulic oil or the response characteristics of a servo valve are efficiently suppressed.

8 Claims, 8 Drawing Sheets

VIBRATION DAMPING EQUIPMENT

BACKGROUND OF THE INVENTION

This invention relates to a vibration damping equipment for damping the vibration of a structure due to an external force such as an earthquake and the wind.

Vibration damping equipment which includes a control device for damping a vibration mounted to a structure such as a high- and medium-rise building, and which receives energy supplied from the outside to damp positively a vibration is known by, for example, Tokkai Sho 63-217075 published in 1988 by the Japanese Patent Office. The equipment is such that, as shown in FIGS. 6 and 7, a mass 2 is supported in movable relationship by wheels 10 on a structure 1, and the mass 2 is allowed to be displaced by the use of hydraulic cylinders 6.

The mass 2 is connected in four horizontal directions with the four hydraulic cylinders 6. A rod 7 of each hydraulic cylinder 6 is connected at one end thereof to a wall 8 provided on the structure 1 in a manner to surround the mass 2, and is extended or retracted by a high-pressure hydraulic off supplied from a hydraulic unit 9 to drive the mass 2.

For example, if the structure is shaken in an any direction by an external force, the hydraulic cylinder 6 will drive the mass 2 in the same direction as that direction. This driving causes the force exerted on the structure 1 by the mass 2 to become opposite in direction to the external force acting on the structure 1, thereby providing an action of damping shaking of the structure 1. In this manner, the shaking of the structure due to an external force such as an earthquake and the wind is damped.

The structure 1 and the mass 2 are mounted with displacement sensors 11 and 12 for detecting an absolute displacement of the structure 1 and the mass 2, respectively.

FIG. 8 shows a control model for the equipment of FIGS. 6 and 7. In this model, for simplicity, one cylinder 6 is adapted to drive the mass 2. Now, it is assumed that where the mass 2 is shaken in a horizontal direction in FIG. 6, the mass 2 is shaken in a vertical direction in the model of FIG. 8.

The displacement sensor 11 detects an absolute displacement $x_1$ of the structure 1, while the displacement sensor 12 detects an absolute displacement $x_2$ of the mass 2.

The absolute displacements $x_1$ and $x_2$ exhibit a positive or negative value with the displacements taken as zero where the structure 1 and the mass 2 are positioned at their respective central position.

Signals from these displacement sensors 11 and 12 are inputted into a controller 30 comprising a state variable setting unit 31 and a calculation unit 32.

In the state variable setting unit 31, a relative displacement $x_2'$ of the structure 1 to the mass 2 is calculated by a subtracter 33 from the absolute displacements $x_1$ and $x_2$ of the structure 1 and the mass 2, and then in differentiators S1 and S2, from the relative displacement $x_2'$ and the absolute displacement $x_1$, an absolute velocity $v_1$ of the structure 1 and a relative velocity $v_2'$ of the structure 1 to the mass 2 are calculated.

The state variables (the absolute displacement $x_1$, the absolute velocity $v_1$, the relative displacement $x_2'$, the relative velocity $v_2'$) thus calculated are inputted into the calculation unit 32. In the calculation unit 32, each state variable is multiplied by an optimum preset feedback gain matrix $K=(f_1 f_2 f_3 f_4)$, and a control input value u obtained by adding these multiplied values is calculated by the following $$u=f_1{}^*x_1+f_2{}^*x_2'+f_3{}^*v_1+f_4{}^*v_2' \quad \text{Equation 1}$$

The optimum feedback gain matrix K is preset so that the evaluation function becomes minimum on the basis of an optimum regulator theory. The method of calculating the optimum feedback gain matrix K and the evaluation function on the basis of an optimum regulator theory is well known and disclosed in the following document:

"A Guide to System Control Theory" (by K. Ogo and T. Mita, published by Jikkyo Shuppan Co., pp. 157–160, Dec. 15, 1979)

The optimum regulator theory will be briefly explained. A vibration exciting force exerted on the structure 1 is taken as F, and a state variable $x=(x_1\ x_2'\ v_1\ v_2')^T$. By the use of these, linearizing properly a physical equation representing the model of FIG. 8 causes the following equations to be obtained:

$$\dot{x}=A{}^*x+B{}^*u+E{}^*F \quad \text{Equation 2}$$

$$y=C{}^*x \quad \text{Equation 3}$$

In the above-mentioned equations, A, B and E are constant matrixes of 4×4, 4×1 and 4×1, respectively, determined by the items of the structure 1 and a vibration damping equipment; and C is a constant matrix of n×4 (in this case, 4×4) determined according to the number of state variables inputted. At this point, the feedback gain matrix K is calculated by the following equation using the matrixes A and B in the equation 2:

$$K=R_K{}^{-1}{}^*B^T{}^*P_K \quad \text{Equation 4}$$

where, $P_K$ is a solution to a matrix equation shown in Equation 5:

$$P_K{}^*A+A^T{}^*P_K-P_K{}^*B{}^*R_K{}^{-1}{}^*B^T{}^*P_K+Q_K=0 \quad \text{Equation 5}$$

where, $Q_K$ and $R_K$ are design parameters.

The control input value u outputted from the controller 30 on the basis of the optimal feedback gain matrix K thus calculated is conducted to a solenoid 15 for driving a spool 14 of a servo valve 13.

In FIG. 8, of three upper ports of the servo valve 13, a central port 16 communicates with a pump P, and right and left ports 17 and 18 communicate with a tank T. The two lower ports 19 and 20 communicate with oil chambers of the hydraulic cylinder 6.

In FIG. 8, when the structure 1 receives an external force such as an earthquake and the wind and begins to shake in the upper direction in FIG. 8 (equivalent to right direction in FIG. 6), the controller 30 calculates the control input value u from signals detected in the displacement sensors 11 and 12.

The control input value u is outputted to the solenoid 15 to cause the spool 14 of the servo valve 13 to be displaced to the right position as shown in FIG. 8. In this state, a hydraulic off is supplied through the ports 13 and 20 to the lower oil chamber of the cylinder 6, while the hydraulic oil of the upper oil chamber is returned through the ports 19 and 18 to the tank T, whereby the piston is pushed up in the cylinder 6.

That is, the rod 7 of the hydraulic cylinder 6 causes the mass 2 to be displaced behind in the movement of the structure 1 in the upward direction as with the structure 1. Conversely when the structure 1 is shaken in the downward direction, the sign of the control input u becomes opposite, so that the spool 14 is slid in the left direction of FIG. 8 to cause the mass 2 to be driven downward.

A reaction force developed by moving the mass 2 acts on the structure 1 against the external force exerted on the structure 1. The reaction force causes the vibration on of the structure 1 to be damped.

In the vibration damping equipment, its control system has been simplified by neglecting a high-order vibration mode equal to or higher than two-order, and the control gain set on the basis of the optimal feedback theory has been made a constant value without according to a vibration frequency as shown in FIG. 9. Therefore, increasing the control gain to improve the vibration effect of a structure may have caused a vibration due to the neglected high-order vibration mode or a vibration due to the response characteristics of the servo valve and to the compressibility of the hydraulic oil to be developed in the structure.

Since the control gain is a constant value, a disturbance with a very long cycle due to the wind is exerted on a structure, a problem has existed in that the mass is displaced excessively as shown in FIG. 10, whereby the effective stroke of the hydraulic cylinder used to damp a disturbance with a short cycle due to an earthquake is reduced by the excessively displaced portion.

Further, it is necessary to give all four state variables required for control to the equipment, so that the configuration of devices such as differentiator for performing the signal processing of sensors has become complex, thereby partly causing the manufacturing cost of the equipment to be increased.

SUMMARY OF THE INVENTION

It is therefore an object of this invention to suppress a vibration of the mass due to a high-order vibration mode of a structure and a vibration of the mass caused by the compressibility of a hydraulic oil or the response characteristics of a servo valve.

It is a further object of this invention to restrain a reduction in the effective stroke of an mass due to a vibration of a low frequency.

It is still a further object of this invention to reduce the manufacturing cost of a vibration damping equipment.

In order to achieve the above objects, this invention provides a vibration damping equipment for a structure that is vibrated by an external force. The equipment comprises a mass supported on the structure such that it is free to move in a direction of the vibration of the structure, an actuator for driving the mass in the direction of the vibration, a mechanism for detecting state variables relating to the vibration, a Kalman filter for performing a predetermined calculation processing on the state variables by comparing with a structure model included therein to estimate proper values of state variables, a mechanism for calculating control input values from the proper values based on an optimal/feedback gain matrix preset on the basis of an optimal regulator theory, and a mechanism for driving the actuator according to the control input values.

According to an aspect of this invention, the predetermined calculation processing comprises a damping of a predetermined low-frequency vibration of the mass.

According to another aspect of this invention, the predetermined calculation processing comprises a damping of a predetermined high-frequency vibration of the mass.

According to yet another aspect of this invention, the state variables comprises an absolute velocity of the structure and a relative displacement amount of the mass.

According to yet another aspect of this invention, the state quantities comprises an absolute displacement amount of the structure, an absolute velocity of the structure, a relative displacement amount of the mass and a relative velocity of the mass.

The details as well as other features and advantages of this invention are set forth in the remainder of the specification and are shown in the accompanying drawings.

DETAILED DESCRIPTION ON THE INVENTION

Figure 1:
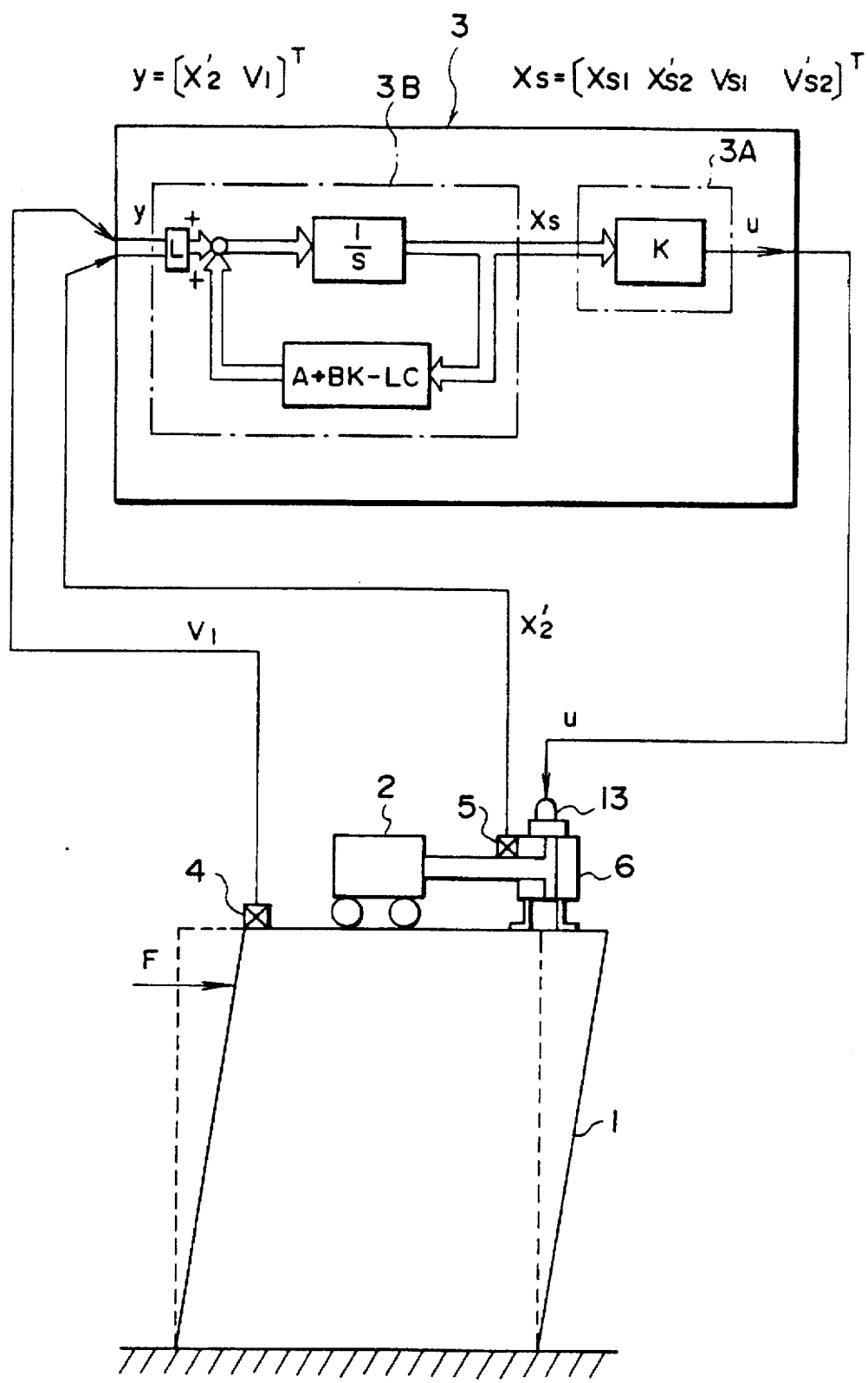
FIG. 1 is a schematic diagram of a vibration damping equipment according to this invention.

Referring to FIG. 1 of the drawings, the mass 2 is supported by the wheels 10 on the floor of the uppermost portion of the structure 1. The hydraulic cylinders 6 function as actuators, are mounted to the mass 2, and drive the mass 2 according to the hydraulic oil supplied from the hydraulic unit 9.

Mounted on the uppermost portion of the structure 1 is a speed sensor 4 for detecting the absolute velocity $v_1$ of the displacement of the structure 1. Disposed on the hydraulic cylinder 6 is a displacement sensor 5 for detecting the relative displacement $x_2'$ of the structure 1 to the mass 2. The speed sensor 4 and displacement sensor 5 are configured by state variable detection means.

The state variables $v_1$ and $x_2'$ detected by the speed sensor 4 and the displacement sensor 5 are inputted into the controller 3, which in turn controls through the servo valve 13 the driving of the mass 2 on the basis of the control input value u calculated according to these variables.

The controller 3 comprises a Kalman filter 3B for estimating an absolute displacement $x_{s1}$ of the structure 1 and a relative velocity $v_{S2}'$ of the mass 2 to the structure 1 from the two state variables of the absolute velocity $v_1$ and the relative displacement $x_2'$, and an optimal regulator 3A for calculating the control input value u from an estimated state quantity $X_s$ calculated by the Kalman filter 3B and a preset optimal feedback gain matrix K.

The Kalman filter 3B performs a calculation on the basis of the stationary Kalman filter theory. The stationary Kalman filter theory is well known from the above-mentioned "A Guide to System Control Theory", so that only the outline thereof will be explained here.

The Kalman filter 3B houses a model of a controlled subject, understands statistically a disturbance and noise exerted on the actual controlled subject, and corrects the internal model in such a manner that the square error between an inputted state quantity and the state quantity of the internal model becomes minimum. At this point, the state quantity of the controlled subject can be estimated and calculated from the internal model of the Kalman filter 3B. The estimated state quantity $X_s$ comprises an estimated absolute displacement $x_{S1}$, an absolute velocity $v_{S1}$, a relative displacement $x_{S2}'$ and an estimated relative velocity $v_{S2}'$. After the disturbance has ended and a sufficient time has elapsed, these are turned from the inputted known state quantities to the following: $v_{S1}=v_1$, and $x_{S2}'=x_2'$.

The calculation of the estimated state quantity $X_s$ in the Kalman filter 3B is performed on the basis of the following equation:

$$X_s=[A+B*K-L*C]*X_s+L*y \quad \text{Equation 6}$$

In the above-mentioned equation 6, L is a filter gain matrix described later, and A and B employ the same values as in Equation 2 in the above-mentioned prior art example. Since as with the above-mentioned equation 3, two state quantities are inputted into the Kalman filter 3B, C becomes values as shown in the following equation:

$$C=\begin{vmatrix} 0 & 1 & 0 & 0 \\ 0 & 0 & 1 & 0 \end{vmatrix} \quad \text{Equation 7}$$

On the other hand, the filter gain matrix L is calculated from above-mentioned equation 7 by the following equation:

$$L=P_L*C^T*R_L^{-1} \quad \text{Equation 8}$$

$R_L$ is a design parameter, and $P_L$ is a solution to the following matrix equation:

$$P_L*A^T+A*P_L-P_L*C^T*R_L^{-1}*C*P_L+E*Q_L*E^T=0 \quad \text{Equation 9}$$

$Q_L$ is a design parameter, and both $Q_L$ and $R_L$ are matrix.

The estimated state quantity $X_s$ (the estimated absolute displacement $x_{S1}$, the absolute velocity $v_{S1}$, the relative displacement $x_{S2}'$ and the estimated relative velocity $v_{S2}'$) thus calculated is inputted into the optimal regulator 3A. In the optimal regulator 3A, as with the prior art example, there is performed a calculation with the optimal feedback gain matrix $K=(f_1\ f_2\ f_3\ f_4)$ preset for each state variable on the basis of the optimal regulator theory.

The feedback gain matrix K calculated in the optimal regulator 3A is used to calculate the control input value u as with Equation 1 shown in the above-mentioned prior art example, and at the same time, is outputted to the servo valve 13.

Figure 2:
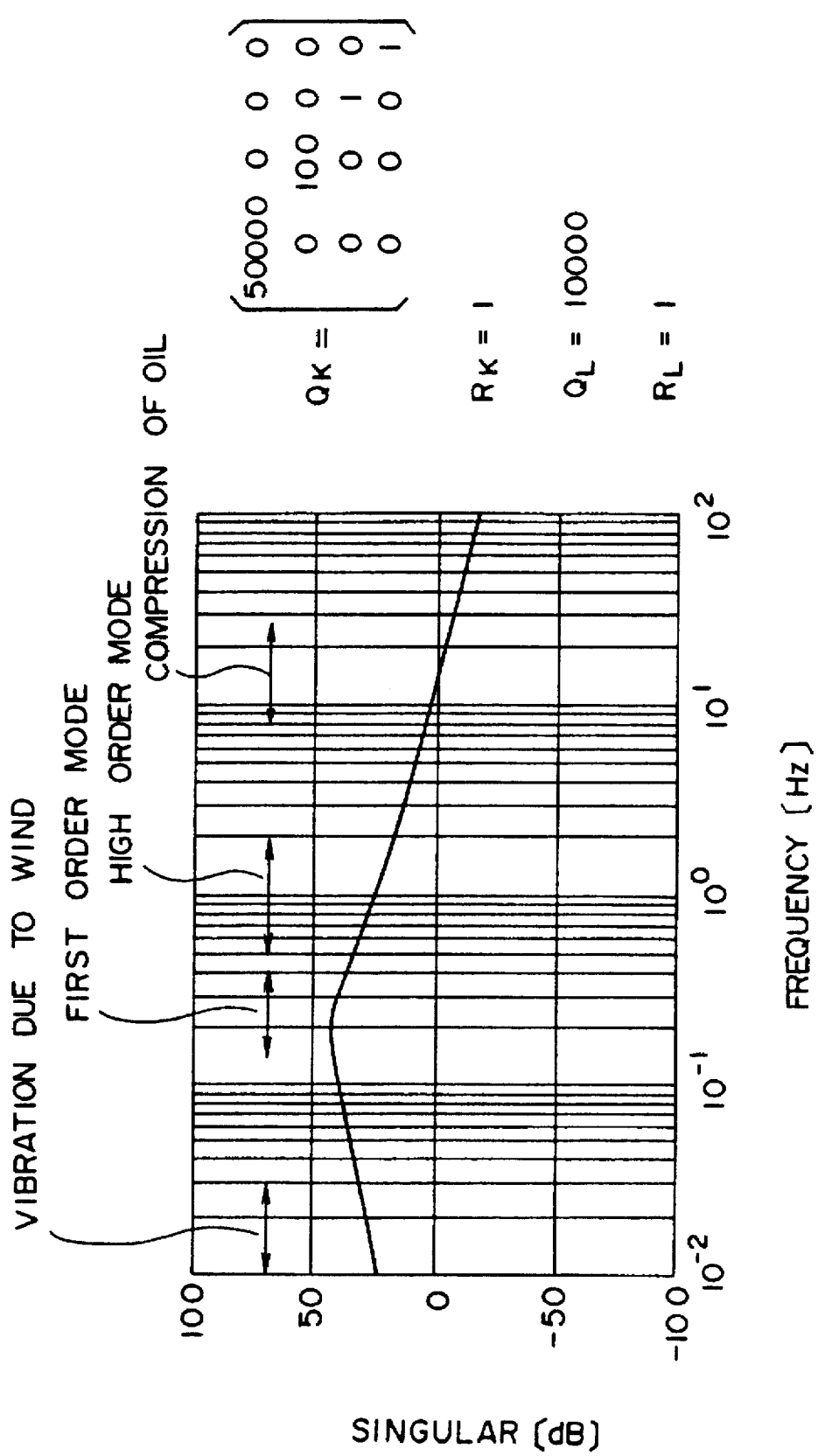
FIG. 2 is a graph showing a relationship between a control gain and a frequency, according to this invention.

FIG. 2 shows the control characteristics of the control input value u outputted by the optimal regulator 3A on the basis of the estimated state quantity $X_s$ estimated in the Kalman filter 3B.

In FIG. 2, the control gain is emphasized in the first-order vibration mode with a vibration frequency region of about 0.15 to 0.4 Hz in which the vibration damping of the structure 1 is performed. The control gain is restrained to a small value in a high frequency vibration region of about 0.5 to 2 Hz which is in the high-order vibration mode of the structure 1, and in a high frequency vibration region of 10 Hz or more due to the compressibility of hydraulic oil. Also, the control gain is restrained to a small value in a low frequency vibration region of about 0.01 Hz which is a long frequency vibration region due to the change in wind force.

Figure 3:
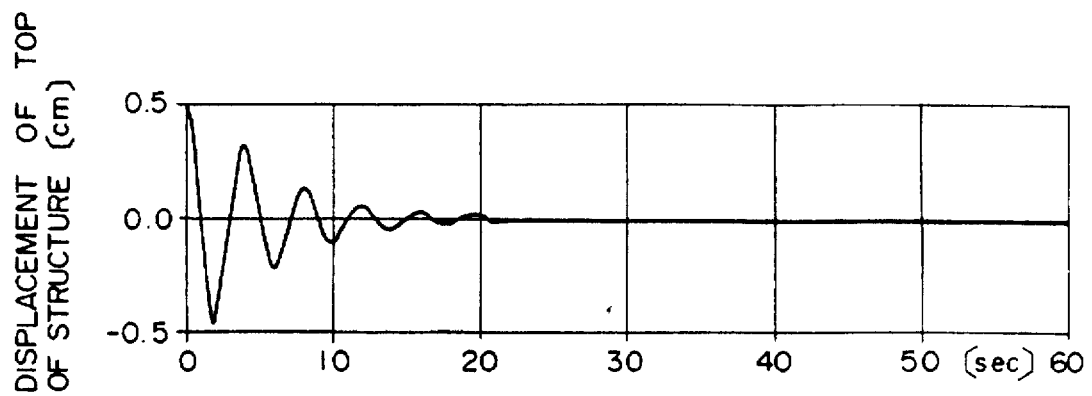
FIG. 3 is a graph showing damping characteristics of a structure, according to this invention.
Figure 4A:
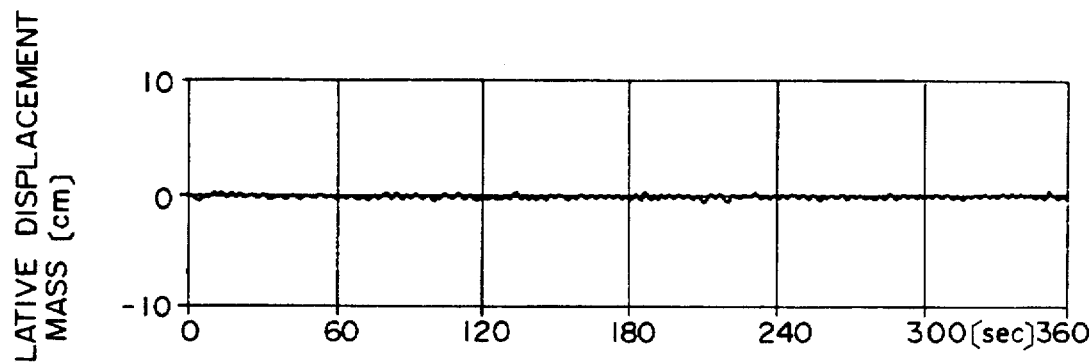
FIG. 4A is a graph showing mass displacement during a low frequency disturbance.
Figure 4B:
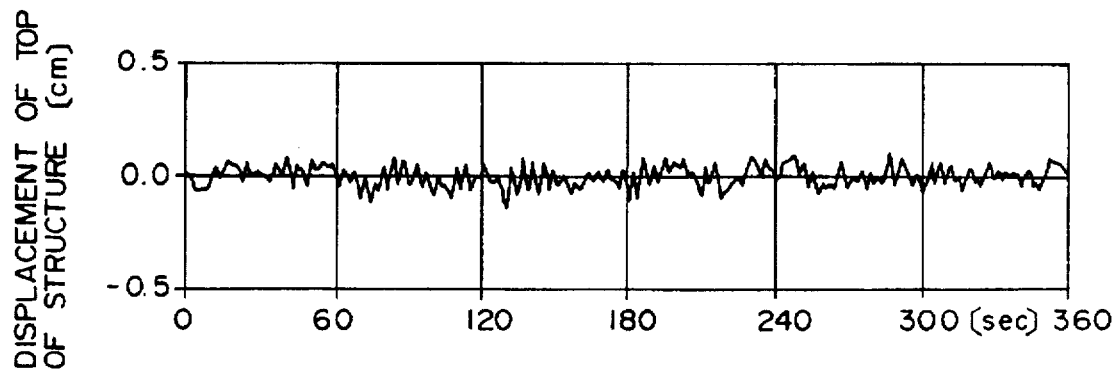
FIG. 4B is a graph showing an absolute displacement of a structure in accordance with invention during a low frequency disturbance.
Figure 10:
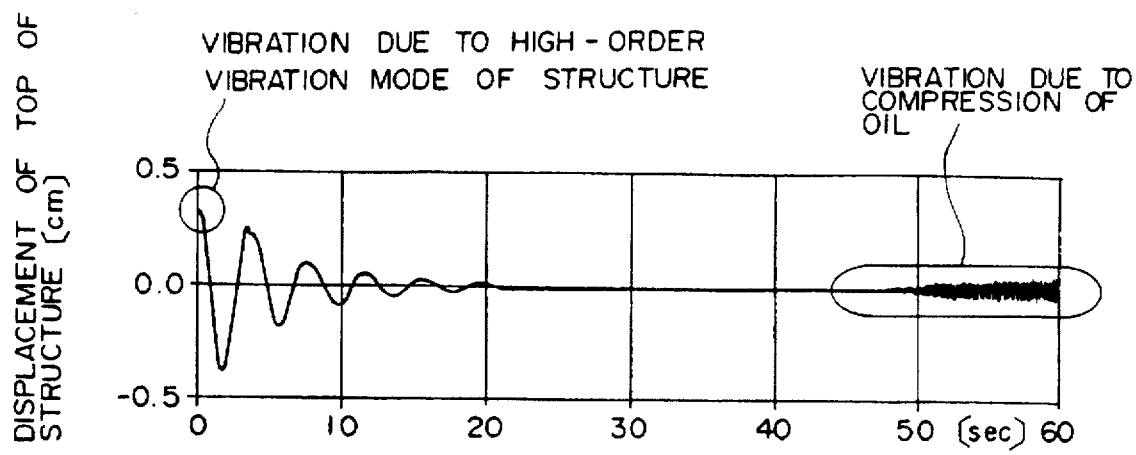
FIG. 10 is similar to FIG. 3, but showing the prior art.
Figure 11A:
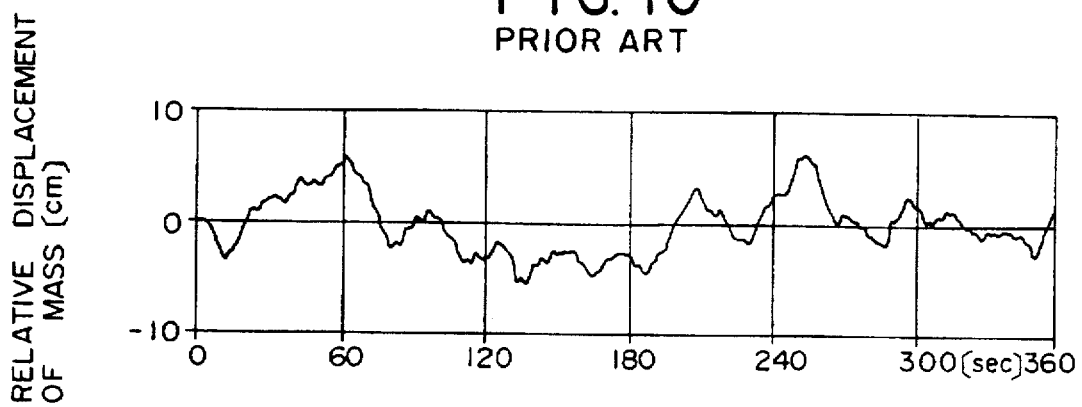
FIG. 11A is a graph showing mass displacement in the prior art.
Figure 11B:
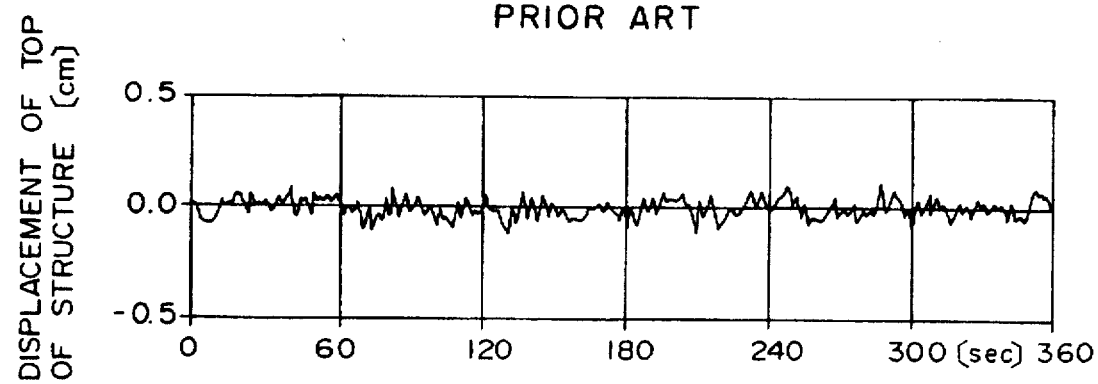
FIG. 11B is a graph showing structure displacement in the prior art.

In this manner, the control gain in a vibration frequency region corresponding to the first-order vibration mode in which vibration damping is preformed is emphasized, while the control gain in other vibration frequency regions is made small, whereby the vibration damping characteristics of the structure 1 become those as shown in FIG. 3. As apparent from FIG. 3, compared with the above-mentioned prior art example shown in FIG. 10, a vibration due to a high-order vibration mode, or a vibration caused by the response characteristics of the servo valve 13 or by the compressibility of the hydraulic oil of the hydraulic cylinder 6 are restrained, so that a stable control characteristics can be obtained by the vibration damping equipment.

Where a disturbance with a very long cycle is exerted on the structure 1, as shown in FIGS. 4 (A) and 4 (B), the mass 2 is held substantially at the central position without responding to a displacement of the structure 1 of low frequency. Therefore, the effective stroke of the hydraulic cylinder 6 is retained for the damping of a disturbance such as an earthquake, whereby the control performance against an earthquake can be secured at all times without being affected by a disturbance such as the wind.

Further, the Kalman filter 3B estimates and calculates the above-mentioned four state quantities required to calculate the optimal regulator 3A from the two inputted state variables (the absolute velocity $v_1$ of the structure 1, the relative displacement $x_2'$ of the mass 2), so that the configuration of the state variable detection means becomes simple and the reliability of the equipment is improved, and in addition, an increase in manufacturing cost can be restrained.

Figure 5:
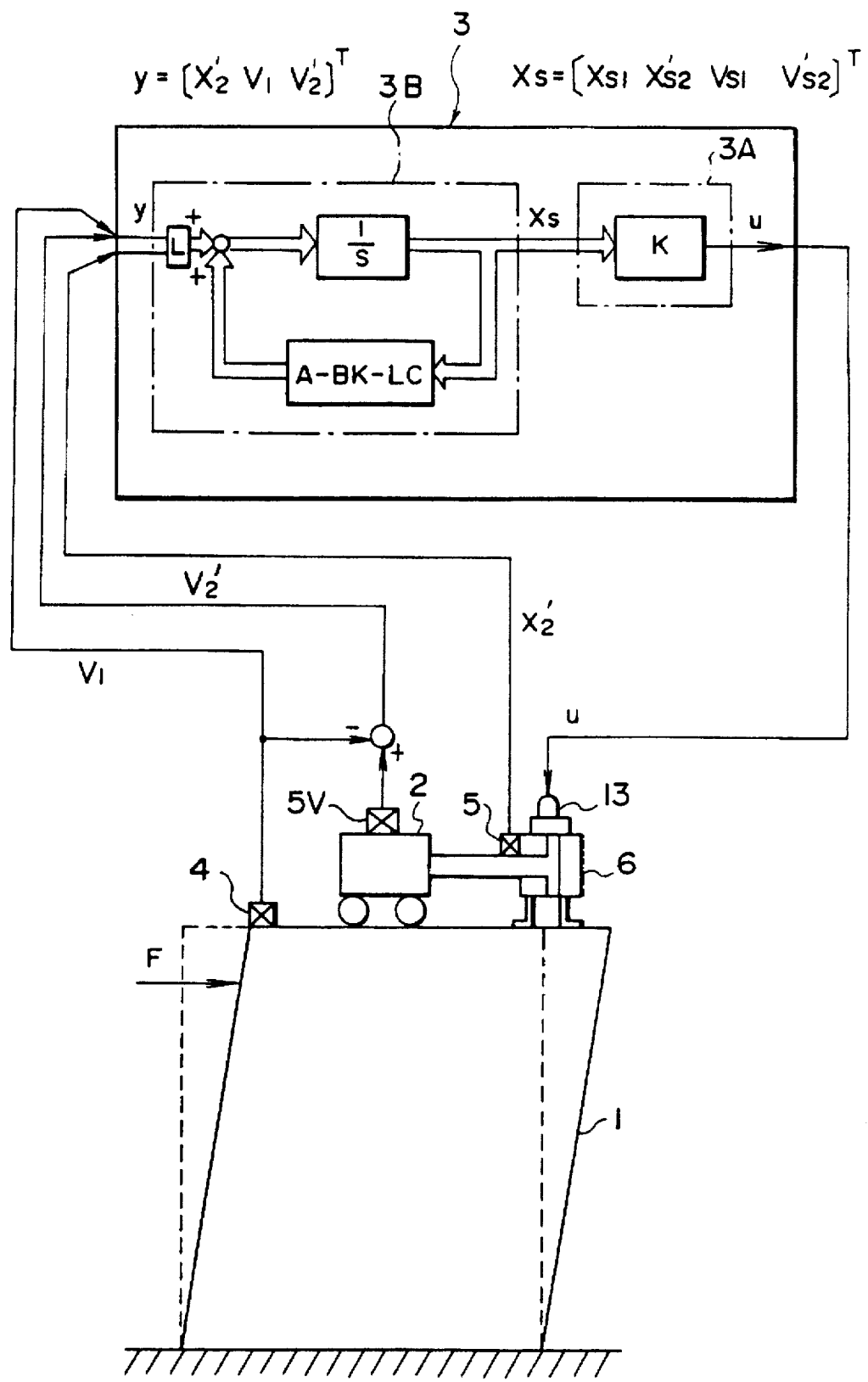
FIG. 5, though similar to FIG. 1, shows an additional embodiment according to this invention.
Figure 6:
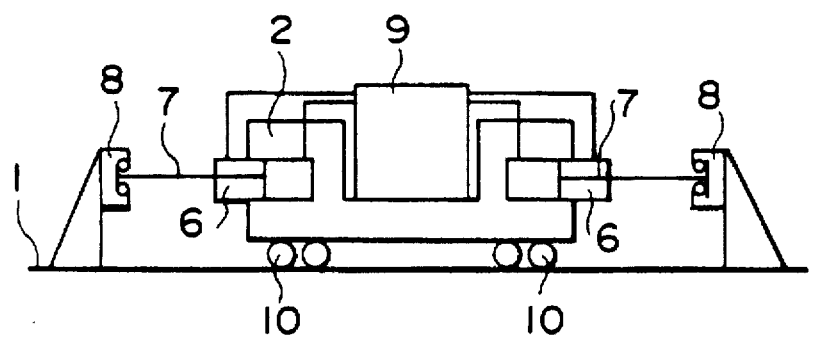
FIG. 6 is a schematic side view of a vibration damping equipment according to a prior art.
Figure 7:
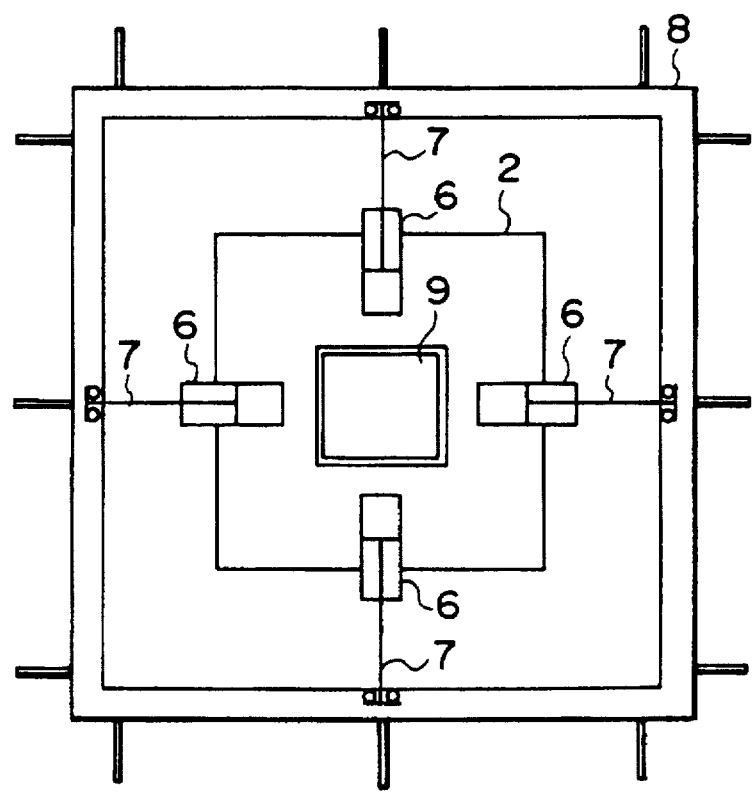
FIG. 7 is a schematic plan view of a vibration damping equipment according to the prior art.
Figure 8:
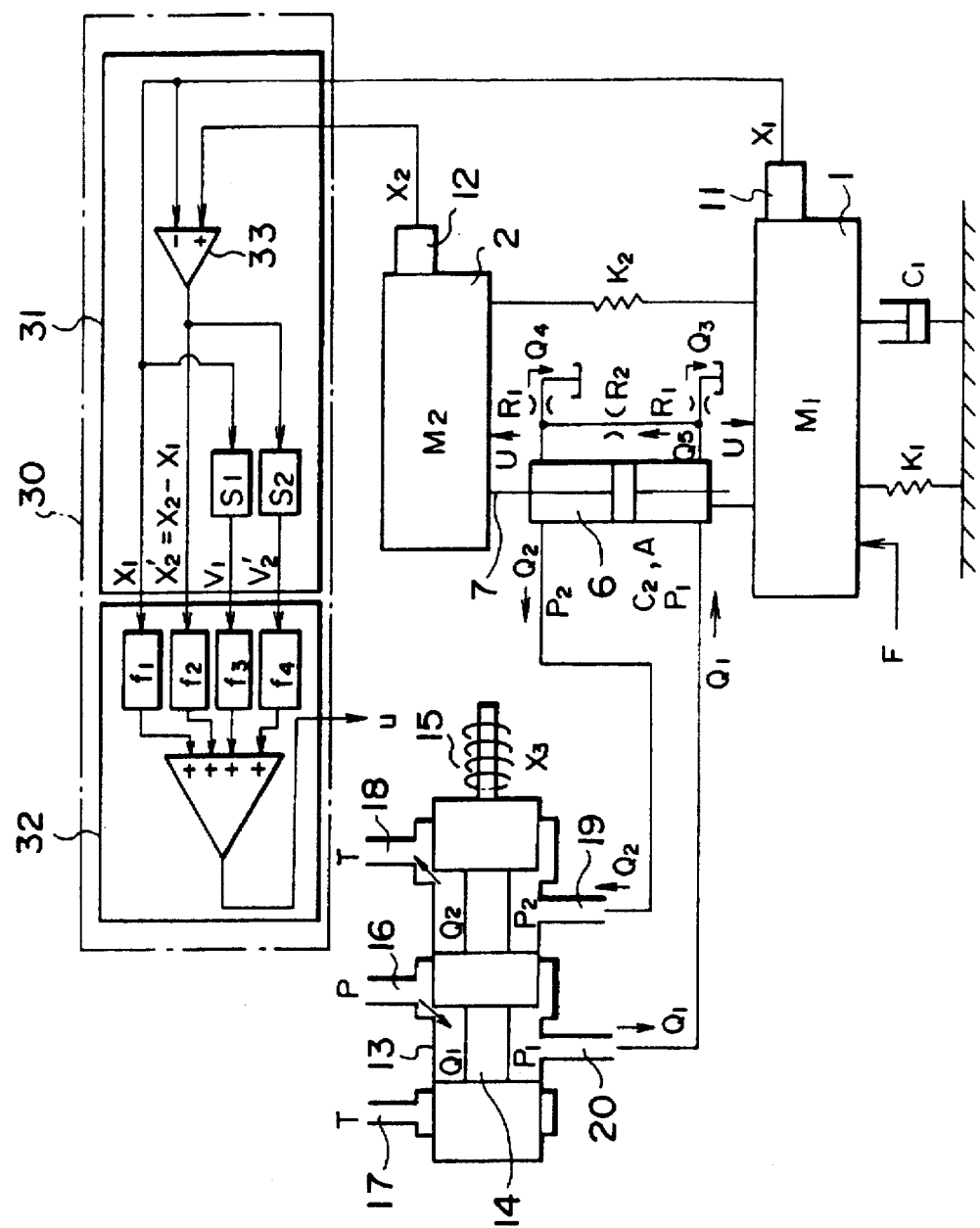
FIG. 8 is a schematic diagram of a vibration damping model according to the prior art.
Figure 9:
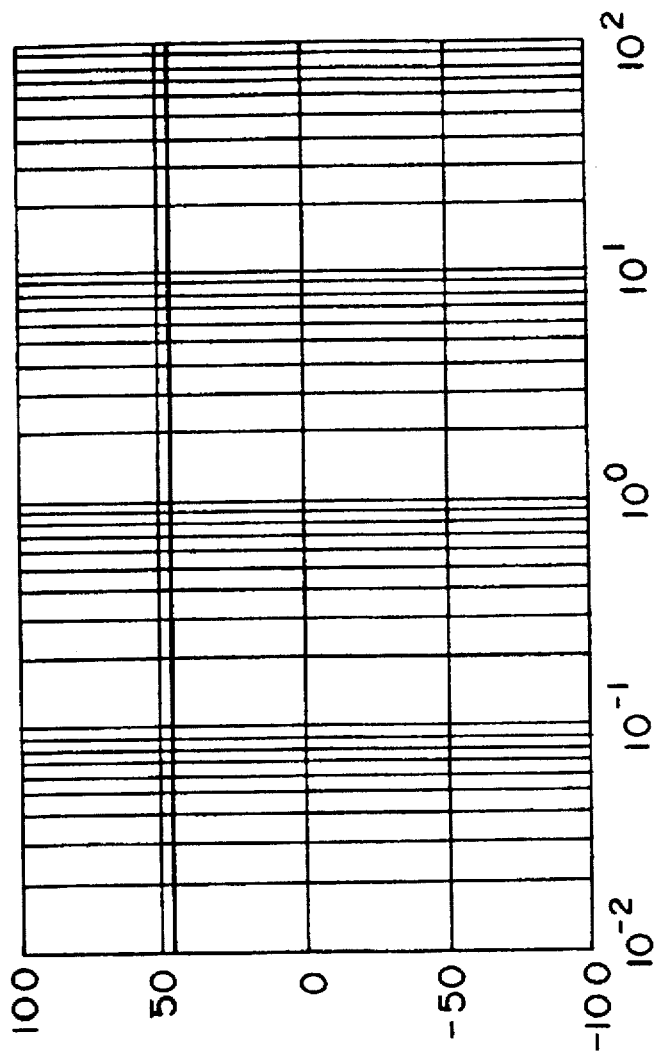
FIG. 9 is similar to FIG. 2, but showing the prior art.

FIG. 5 shows an additional embodiment of this invention.

In FIG. 5, a speed sensor 5 V for detecting a relative velocity $v_2'$ of the mass 2 to the structure 1 is added to the above-mentioned embodiment.

Of the estimated state quantity $X_s$ calculated in the Kalman filter 3B, the estimated relative velocity $v_{S2}'$ of the mass 2, after the disturbance has ended and a sufficient time has elapsed, becomes equal to the actual relative velocity $v_2'$. This embodiment allows the calculation accuracy of the estimated state quantity $X_s$ to be improved, thereby improving the vibration damping performance.

The embodiments of this invention in which an exclusive property or privilege is claimed are defined as follows:

What we claim is:

1. A vibration damping equipment for a structure, said structure being vibrated by an external force, comprising:

a mass supported on said structure such that it is free to move in a direction of the vibration of said structure;

an actuator for driving said mass in said direction;

means for detecting state variables relating to said vibration;

a Kalman filter for performing a predetermined calculation process on said state variables by comparison with a structure model included therein to estimate proper values of state variables;

means for calculating control input values from said proper values based on an optimal feedback gain matrix preset based on an optimal regulator theory; and means for driving said actuator according to said control values.

2. A vibration damping equipment as defined in claim 1, wherein said predetermined calculation processing comprises a damping of a predetermined low-frequency vibration of said mass.

3. A vibration damping equipment as defined in claim 1, wherein said predetermined calculation processing comprises a damping of a predetermined high-frequency vibration of said mass.

4. A vibration damping equipment as defined in claim 1, wherein said state variables comprises an absolute velocity of said structure and a relative displacement amount of said mass.

5. A vibration damping equipment as defined in claim 1, wherein said state quantities comprises an absolute displacement amount of said structure, an absolute velocity of said structure, a relative displacement amount of said mass and a relative velocity of said mass.

6. A vibration damping apparatus for damping vibration in a structure resulting from an external force, comprising:

a mass;

means for movably supporting said mass on said structure to permit movement in a vibration direction of the vibration of said structure;

an actuator for driving said mass in said vibration direction;

means for detecting time domain state variables relating to said vibration;

a Kalman filter for accepting said time domain state variables as input and performing a predetermined calculation on said time domain state variables in accordance with a model of said structure to produce estimated time domain state quantities;

optimal regulator means for calculating control input values from said estimated time domain state quantities based on an optimal feedback gain matrix preset based on an optimal regulator theory; and means for driving said actuator responsive to said control values.

7. The vibration damping apparatus according to claim 6 wherein:

said optimal regulator means provides maximum feedback gain in a first frequency range associated with first-order vibration modes of said structure, reduced feedback gain in a second frequency range associated with low frequency wind action on the structure;

said optimal regulator means provides reduced feedback gain in a third frequency range associated with high-order vibration modes of the structure; and said optimal regulator means provides further reduced feedback gain in a fourth frequency range associated with hydraulic oil compressibility.

8. The vibration damping apparatus according to claim 7 wherein said first frequency range is from about 0.15 to about 0.4 Hz, said second frequency range is around 0.01 Hz, said third frequency range is from about 0.5 to about 2.0 Hz, and said third frequency range begins at and extends above about 10 Hz.

\* \* \* \* \*